US007636277B2

(12) United States Patent
Minotti et al.

(10) Patent No.: US 7,636,277 B2

(45) Date of Patent: Dec. 22, 2009

(54) DRIVE DEVICE, PARTICULARLY FOR A CLOCKWORK MECHANISM

(75) Inventors: Patrice Minotti, Gennes (FR); Gilles Bourbon, Besancon (FR); Patrice Le Moal, Besancon (FR); Eric Joseph, Chaucenne (FR)

(73) Assignee: Silmach, Besancon (FR)

( * ) Notice: Subject to any disclaimer, the term of this patent is extended or adjusted under 35 U.S.C. 154(b) by 344 days.

(21) Appl. No.: 11/662,017

(22) PCT Filed: Sep. 1, 2005

(86) PCT No.: PCT/EP2005/054298

§ 371 (c)(1),
(2), (4) Date: Mar. 5, 2007

(87) PCT Pub. No.: WO2006/024651

PCT Pub. Date: Mar. 9, 2006

(65) Prior Publication Data

US 2008/0316871 A1 Dec. 25, 2008

(30) Foreign Application Priority Data

Sep. 3, 2004 (FR) .................................. 04 09333

(51) Int. Cl.
*G04F 5/00* (2006.01)
*G04B 19/02* (2006.01)
*H02N 1/00* (2006.01)

(52) U.S. Cl. ........................ 368/157; 368/160; 310/309

(58) Field of Classification Search .................. 368/80, 368/87, 88, 157, 160; 310/309, 311
See application file for complete search history.

(56) References Cited

U.S. PATENT DOCUMENTS

| | | | | |
|---|---|---|---|---|
| 3,638,120 | A * | 1/1972 | Jost | 368/114 |
| 5,428,259 | A * | 6/1995 | Suzuki | 310/309 |
| 5,495,761 | A * | 3/1996 | Diem et al. | 73/514.32 |
| 5,631,514 | A * | 5/1997 | Garcia et al. | 310/309 |
| 5,959,376 | A * | 9/1999 | Allen | 310/40 MM |
| 5,998,906 | A * | 12/1999 | Jerman et al. | 310/309 |
| 6,211,599 | B1 * | 4/2001 | Barnes et al. | 310/309 |
| 6,469,415 | B2 * | 10/2002 | Jerman et al. | 310/309 |
| 2002/0067103 | A1 | 6/2002 | Jerman | |
| 2004/0119354 | A1 * | 6/2004 | Takada et al. | 310/90 |

FOREIGN PATENT DOCUMENTS

| | | | |
|---|---|---|---|
| FR | 2 852 111 | A | 9/2004 |
| WO | 01/09519 | A | 2/2001 |
| WO | 2004/081695 | A | 9/2004 |

* cited by examiner

*Primary Examiner*—Vit W Miska
(74) *Attorney, Agent, or Firm*—Pauley Petersen & Erickson

(57) ABSTRACT

A drive device formed by etching a wafer. The drive device includes a drive element that can sequentially mesh with a driven element and an actuating element that can displace the drive element according to a hysteresis movement thereby driving the driven element. Placement of the drive element on an outer edge of the wafer enables an interfacing of the drive element with a driven element placed opposite therefrom. A clockwork mechanism including a drive device of the aforementioned type and an input gear that can be rotationally driven by the drive device is also provided.

31 Claims, 10 Drawing Sheets

DRIVE DEVICE, PARTICULARLY FOR A CLOCKWORK MECHANISM

BACKGROUND OF THE INVENTION

1. Field of the Invention

The invention relates to the area of micro-electromechanical systems (MEMS) or electromechanical microsystems, and more particularly, to the application of these microsystems to clockmaking.

2. Discussion of Related Art

The movements of electromechanical watches or clocks are normally generated by an electric motor such as a micromotor with a progressive magnetic gap (called a Lavet motor or stepping motor), which drives a series of gear trains in rotation. These watches or clocks require complex gear mechanisms that are used to adapt the movement of the rotor to the various rotation speeds required of the hands.

A concern in the area of clockmaking relates to simplifying the design of the components that constitute the movement generating mechanisms.

Another consideration is reducing the number of components used in the mechanisms. Reducing either or both the number of components and the number of assembly operations necessary to create the mechanism allows the efficiency of the mechanisms to be improved, as well as improve the independence of the clock devices and reduce their production costs.

SUMMARY OF THE INVENTION

In the light of these considerations, a problem that the invention seeks to solve is to limit the number of parts necessary for the creation of the gear mechanisms in watch or clock devices.

This problem is solved or addressed by the invention through the use of a drive device which is formed by etching a wafer. The drive device includes a drive element that is capable of meshing sequentially with a driven element, and an actuator element that is capable of moving the drive element with a hysteresis-type motion so that it drives the driven element. The drive element is positioned on an external slice of the wafer in order to allow interfacing of the drive element with a driven element facing it.

The invention allows the motors used traditionally in the area of clockmaking, such as Lavet or stepping motors, to be replaced with clock mechanisms that combine a drive device of the MEMS type (micro-electromechanical systems), formed by wafer etching techniques, and a driven element, with no travel limit, created by means of any alternative microtechnology (chemical etching, micro-moulding, etc.).

The MEMS type drive device proposed in the context of the invention is capable of generating drive forces that are greater by least one order of magnitude than those generated by existing stepping motors. In particular, this device allows the first gearing stage of the clock movements of previous design to be eliminated, and thus leads to a significant improvement in their efficiency.

In the context of the invention, a wafer refers to a substrate onto which the drive device is etched. The wafer is normally formed from a slice of semiconductor material. Several drive devices can thus be manufactured simultaneously from a single wafer.

The semiconductor material forming the wafer can be silicon for example.

Thus, the proposed drive device can be created by a collective method wherein a large number or plurality of drive devices are simultaneously etched onto a wafer of semiconductor material.

Such a collective method can be employed to increase the productivity of drive device production in comparison with the production-line methods employed for the manufacture and assembly of traditional stepping motors.

In the drive device of the invention, the drive element is positioned on an external edge of the wafer, meaning that it is located on the periphery of the wafer.

The coupling of the drive device to a driven element enables the construction of a modular clock drive mechanism. In fact, the mechanical performance of the clock mechanism is dependent upon the characteristics of the driven element (diameter).

The invention also relates to a clock mechanism including a drive device such as that described above and a driven element which can be similar to a sprocket wheel or gear wheel, of any diameter, capable of being driven in rotation by the drive device.

The mechanical performance of clock drive mechanisms (motor torque, speed, etc.) is thus modulated according to the radius of the driven element associated with the drive device.

According to a first embodiment, the driven element is interfaced with the input sprocket wheel of the clock gear train, with the gear train including several output wheels attached to the hands to be driven, so that the driven element and the input sprocket wheel are mounted on a single shaft by means of a complete and coaxial link.

Given the actual forces developed by the MEMS type drive device, this first embodiment is used advantageously to replace the traditional stepping motor as well as the first gearing stage of the clock gear trains of previous design with a simplified clock drive mechanism.

According to a second embodiment, the purpose of which is complete elimination of the clock gear trains of previous designs, the driven element or elements are directly attached to the hand or hands to be driven.

In this second embodiment, the clock mechanism is simplified in relation to the mechanisms of previous design. The mechanism requires no intermediate gear train, since the movement of the hand is directly generated by the MEMS type drive device.

According to a preferred form of this embodiment, the mechanism includes a multiplicity of drive devices of the MEMS type and a multiplicity of driven elements attached respectively to a hand to be driven.

The drive devices can be identical to each other.

Finally, the invention also relates to a clock drive mechanism, that includes:

a first subassembly that includes the MEMS type drive device, a second subassembly that includes a micro-machined driven element, and a base onto which the first and second subassemblies are fixed in order to allow interfacing of the drive element with the driven element facing it, wherein the subassemblies are modular and interchangeable.

The coupling of the drive device, formed by etching on a wafer, and an independent driven element, allows the creation of a modular mechanism, meaning a mechanism in kit form. In fact, the mechanical performance of a clock drive mechanism with no travel limit is directly modulated according to the characteristics of the driven element with which it is coupled. This characteristic provides flexibility in the choice of subassemblies, in accordance with the construction constraints of the clock drive mechanism.

Other characteristics and advantages of the invention will emerge from the description that follows, which is purely illustrative and non-limiting, and should be read with reference to the appended figures.

DESCRIPTION OF PREFERRED EMBODIMENTS

Figure 1:
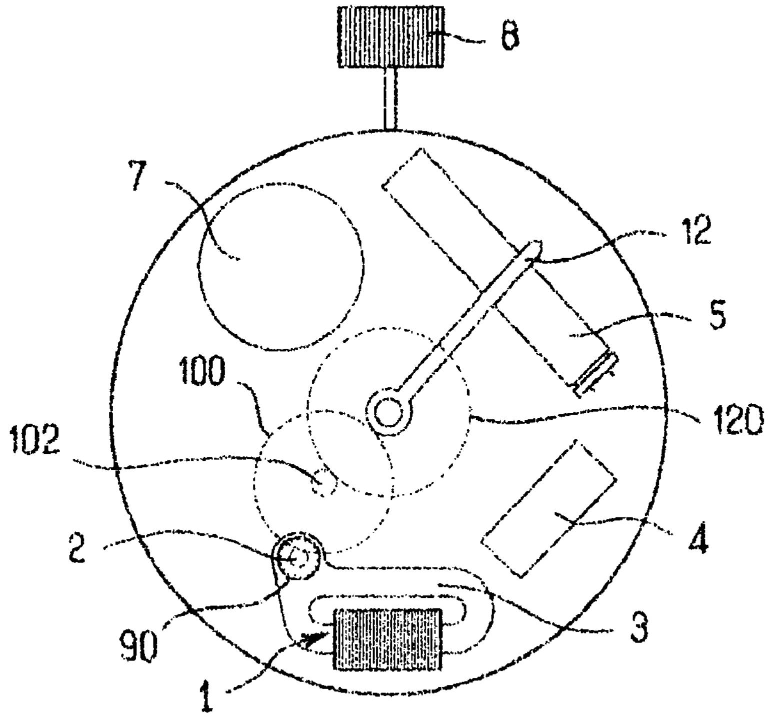
FIG.1 PRIOR ART
FIG. 1 schematically represents a quartz watch mechanism with a stepping motor according to a previous design.

In FIG. 1, a mechanism according to previous designs includes a stepping motor 1 with a rotor 2 and a stator 3. The rotor 2 is attached to a sprocket wheel 90 which meshes with a driven element in the form of a toothed wheel 100. The driven element 100 is attached to a multiplicity of input wheels concentric with the driven element 100. Only one of the input wheels 102 is shown in FIG. 1. Each input sprocket wheel meshes with an output wheel attached to a hand to be driven. Only one output wheel 120, driven by the input sprocket wheel 102 and the associated hand 12, is shown in FIG. 1. The mechanism also includes control electronics 4, a quartz crystal 5, a battery 7 and a winding mechanism 8.

According to the mechanism shown in FIG. 1, a single motor 1 and a single driven element 100 control a multiplicity of output wheels, each output wheel being associated with a hand to be driven.

Figure 2:
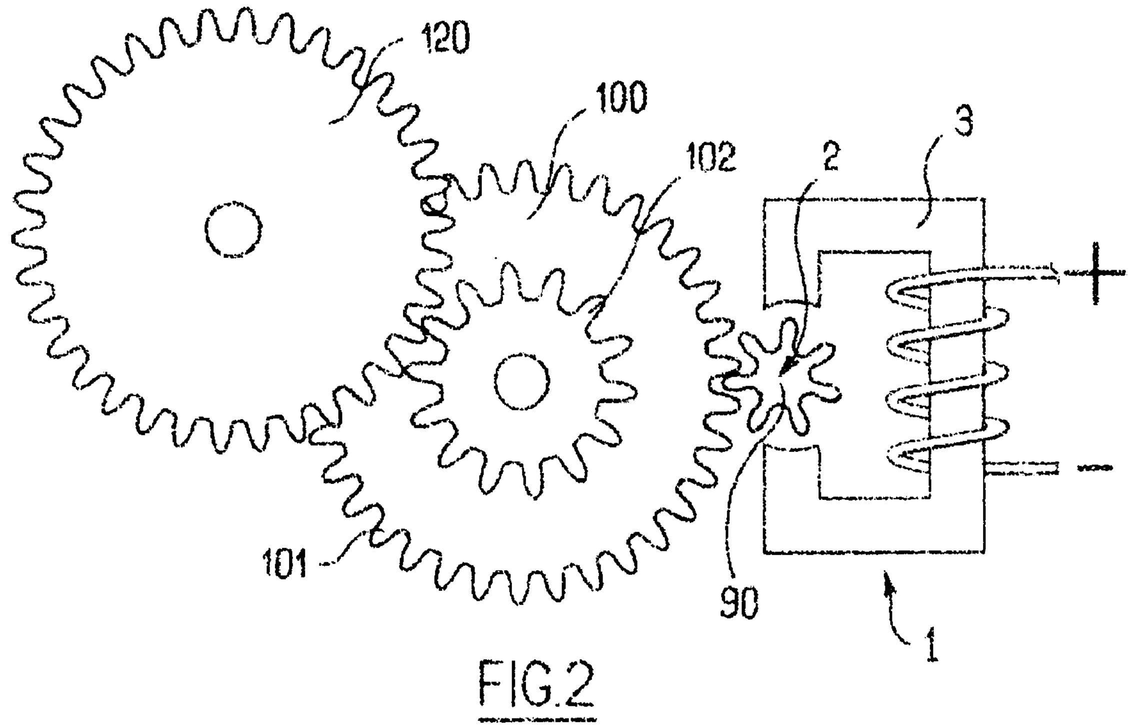
FIG.2 PRIOR ART
FIG. 2 schematically represents the gearing elements of the mechanism of FIG. 1, where the input sprocket wheel of the clock gear train is attached to the rotor of the stepping motor.

As can be seen with greater detail in FIG. 2, the combination of the sprocket wheel 90 and the toothed wheel 100 form a first gearing stage. In addition, the combination of the input sprocket wheel 102 and the output wheel 120 forms a second gearing stage. The combination of these two gearing stages is used to convert the rotation speed of the rotor 2 into a rotation speed that is suitable to drive the hand 12. The ratio of the diameters of the wheels of the gear mechanism determines the rotation speed of the hand associated with each output wheel.

Figure 3:
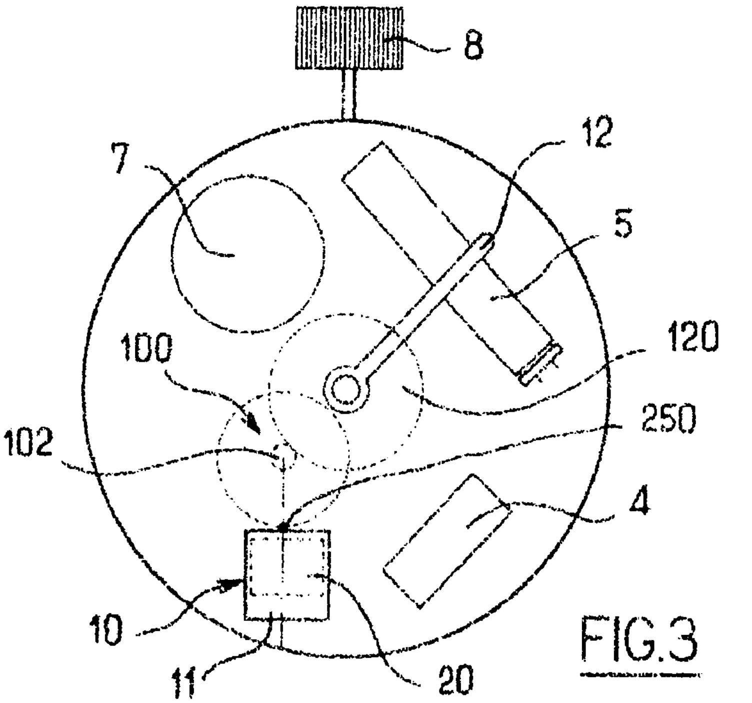
FIG. 3 schematically represents a quartz watch mechanism according to a first embodiment of the invention, which involves replacing the stepping motor and the first gearing stage with a clock drive mechanism of the MEMS type.

FIG. 3 represents a quartz watch mechanism according to a first embodiment of the invention.

According to this first embodiment, the watch mechanism is identical to the mechanism shown in FIG. 1, except that the stepping motor and the sprocket wheel 90 have been replaced by a drive device 10 formed by etching a wafer of semiconductor material. The drive device 10 includes a drive element 250 that is capable of meshing sequentially with the driven element 100, and an actuator element 20 that is capable of moving the drive element 250 with a hysteresis-type motion so that it drives a driven element 100 formed by a toothed wheel. The drive element 250 is positioned on an edge of the wafer 11 to allow interfacing with the driven element 100 facing it.

Figure 4A:
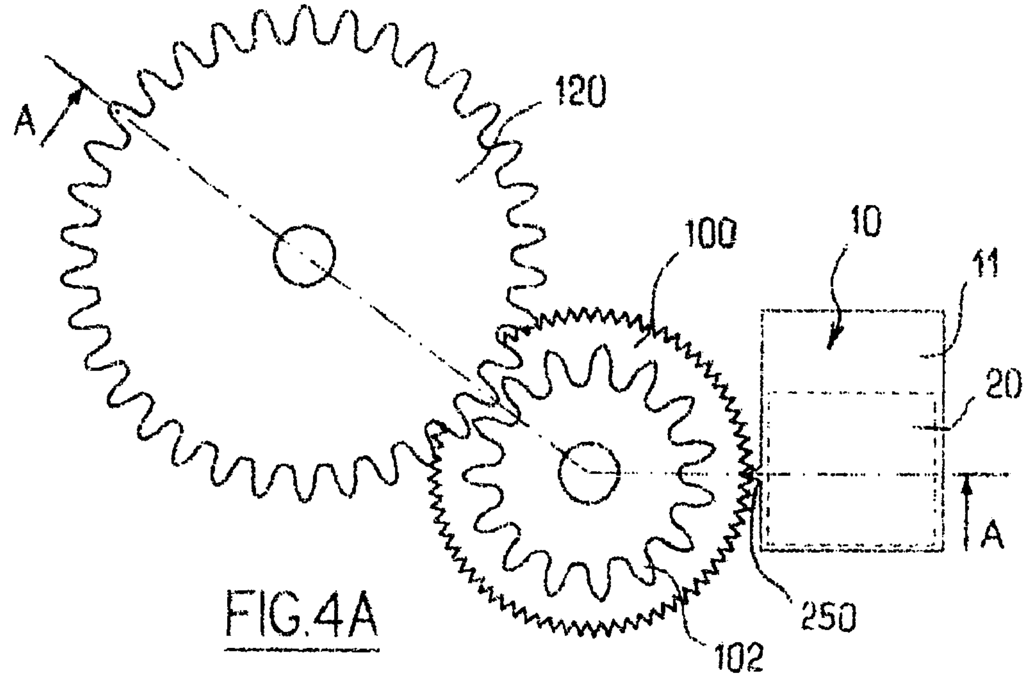
FIGS. 4A and 4B schematically represent subassemblies making up the MEMS type drive mechanism of FIG. 3, as well as the mechanical interfacing of the drive mechanism with a conventional gear train (in plane view and in section along the line A-A respectively).
Figure 4B:
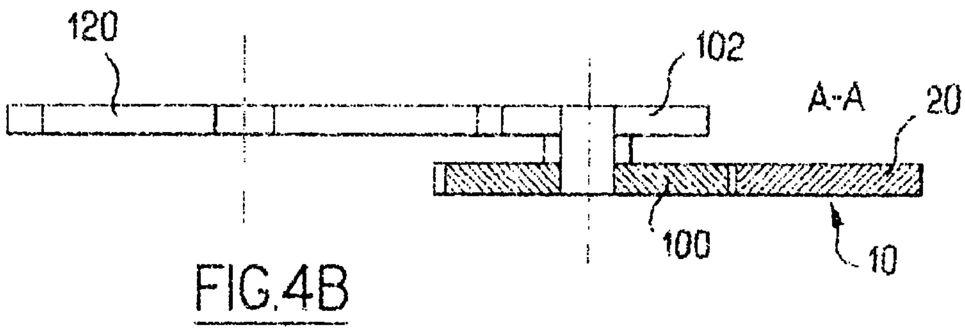

As can be seen with greater detail in FIGS. 4A and 4B, in the first embodiment, the first gearing stage has been removed in relation to the mechanism of FIG. 1. Through a direct coupling between the drive element 250 and the driven element 100, the drive mechanism now requires only one gearing stage per hand to be driven, where each gearing stage allows the rotation movement of the driven element 100 to be converted into a rotational movement of one of the hands (seconds, minutes or hours).

Figure 5:
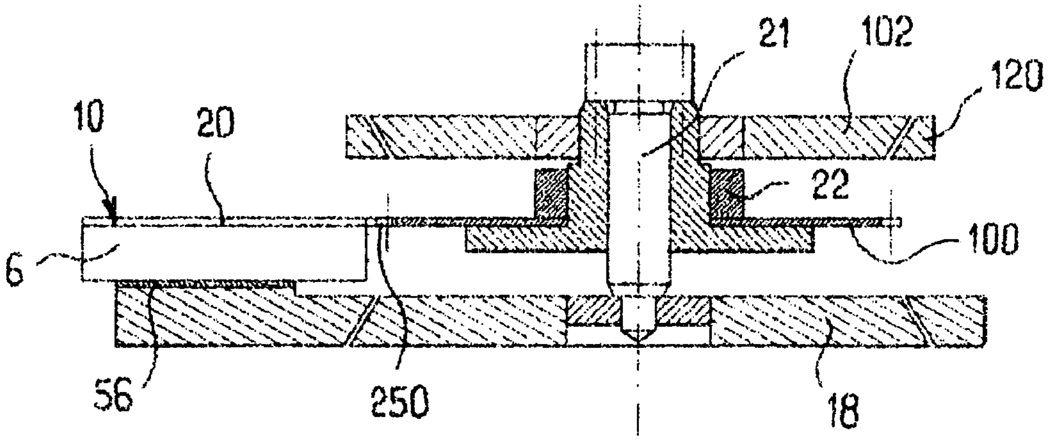
FIG. 5 schematically represents, in section, the connection between the drive device and an input sprocket wheel in a quartz watch mechanism according to the first embodiment of the invention.

FIG. 5 represents, in section, the link between the drive device 10 and the driven element 100 in the quartz watch mechanism according to the first embodiment of the invention. The watch mechanism includes a base 18 onto which are fixed the assembly formed by the drive device 10 and a support 6, as well as an axle 21 extending in a direction generally perpendicular to the base 18. The support 6 is fixed to the base 18 of the watch mechanism by an insulating layer 56. The axle 21 supports an input toothed wheel 100 with a rim of triangular teeth and a hub 22 fitted to rotate on the axle 21. The drive device 10 and the input sprocket wheel 100 are positioned in relation to each other so that at rest, when the drive device 10 is not powered, the drive element 250 is in an engaged position between two teeth of the driven element 100.

In operation, when the drive device 10 is powered, it drives the driven element 100 in rotation. The driven element 100 is associated with one or more input wheels by a complete and coaxial link. The input wheel or wheels 102 mesh with one or more output wheels 120, with each output wheel being attached to a hand.

It will be observed that the driven element 100 formed from a toothed wheel and the hub 22 can be created by a traditional machining technique or by a micro-manufacturing technique, such as, for example, by a deep reactive ion etching (RIE) technique in a monolithic wafer of monocrystalline silicon or in a wafer of the SOI type. The selected technique allows the creation of a tooth pitch that is compatible with the amplitude of movement of the drive element 250.

Figure 6:
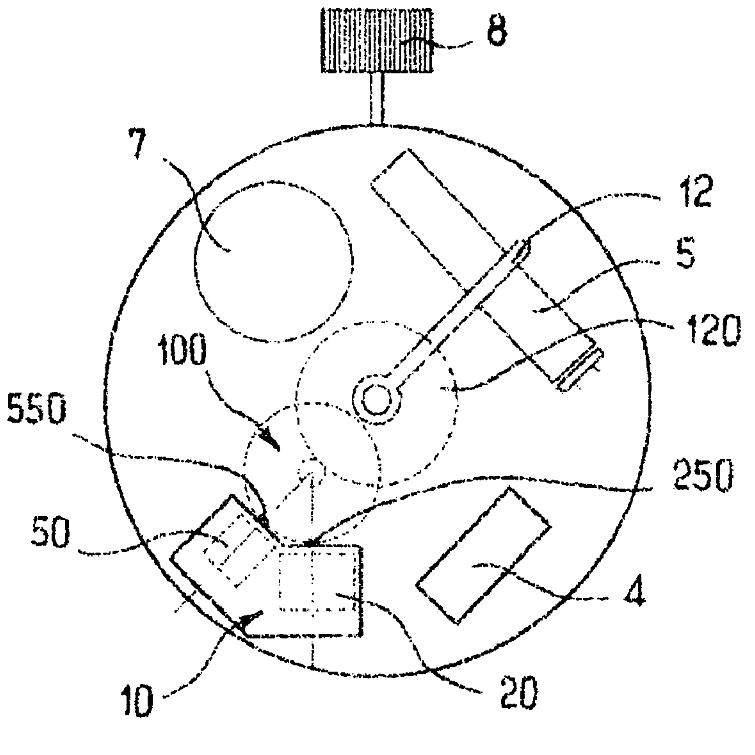
FIG. 6 schematically represents a quartz watch mechanism according to a variant of the first embodiment of the invention.

FIG. 6 illustrates a variant of the first embodiment of the invention. In this variant, the drive device 10 also includes an engaging element 550 that is capable of being inserted sequentially between the teeth of the driven element 100 and an engaging actuator element 50 that is capable of moving the engaging element in an alternating back-and-forth motion so that is inserted between the teeth of the driven element 100.

As can be seen in FIGS. 3 to 6, the drive element 250 and the engaging element 550 are positioned on an external edge of the wafer 11, so that they project out of the wafer 11 and can be coupled to the driven element.

Figure 12:
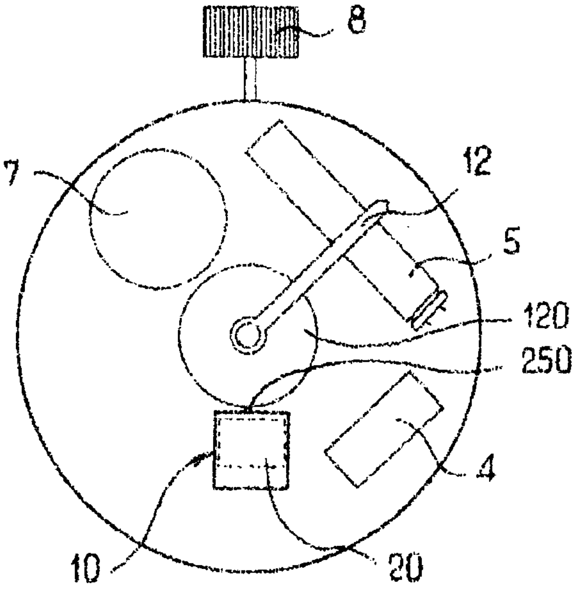
FIG. 12 schematically represents a simplified quartz watch mechanism according to a second embodiment of the invention.

FIG. 12 schematically represents a quartz watch mechanism according to a second embodiment of the invention. According to this second embodiment, one or more drive devices each meshes with one or more drive elements. As can be seen in FIG. 12, the drive device 10 meshes with the driven element 100 formed by a wheel, with the wheel being directly attached to a hand 12.

Figure 13:
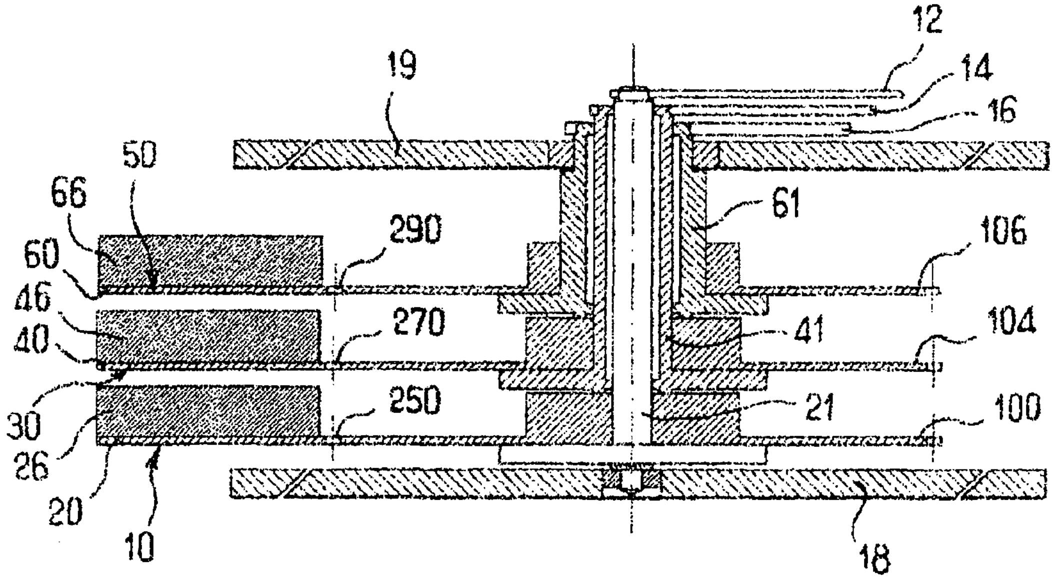
FIG. 13 schematically represents, in section, the links between the drive devices and the respective output wheels attached directly to the hands to be driven, in a quartz watch mechanism according to the second embodiment of the invention.

FIG. 13 represents, in section, the links between drive devices 10, and 50 and driven elements 100, 104 and 106 formed by toothed wheels in a quartz watch mechanism according to the second embodiment of the invention.

In this second embodiment, each drive device 10, 30 and 50 is similar to the drive device 10 of the first embodiment illustrated in FIGS. 3 to 6. Each drive device 10, 30 and 50 includes a drive element, referenced 250, 270 and 290 respectively, and an actuator element, referenced 20, 40 and 60 respectively.

The drive devices 10, 30 and 50 can be created by a deep reactive ion etching (RIE) technique in a monolithic wafer of monocrystalline silicon or in a wafer of the SOI type. Each drive device 10, 30 and 50 meshes with a driven element 100, 104, 106, with each driven element 100, 104, 106 being attached to a hand 12, 14 or 16. The hands 12, 14 and 16 are hands that indicate the seconds, minutes and hours, respectively. Each hand 12, 14 and 16 is thus made to rotate individually by a dedicated actuating device 10, 30 and 50.

This second embodiment requires no gear mechanism.

Figure 10:
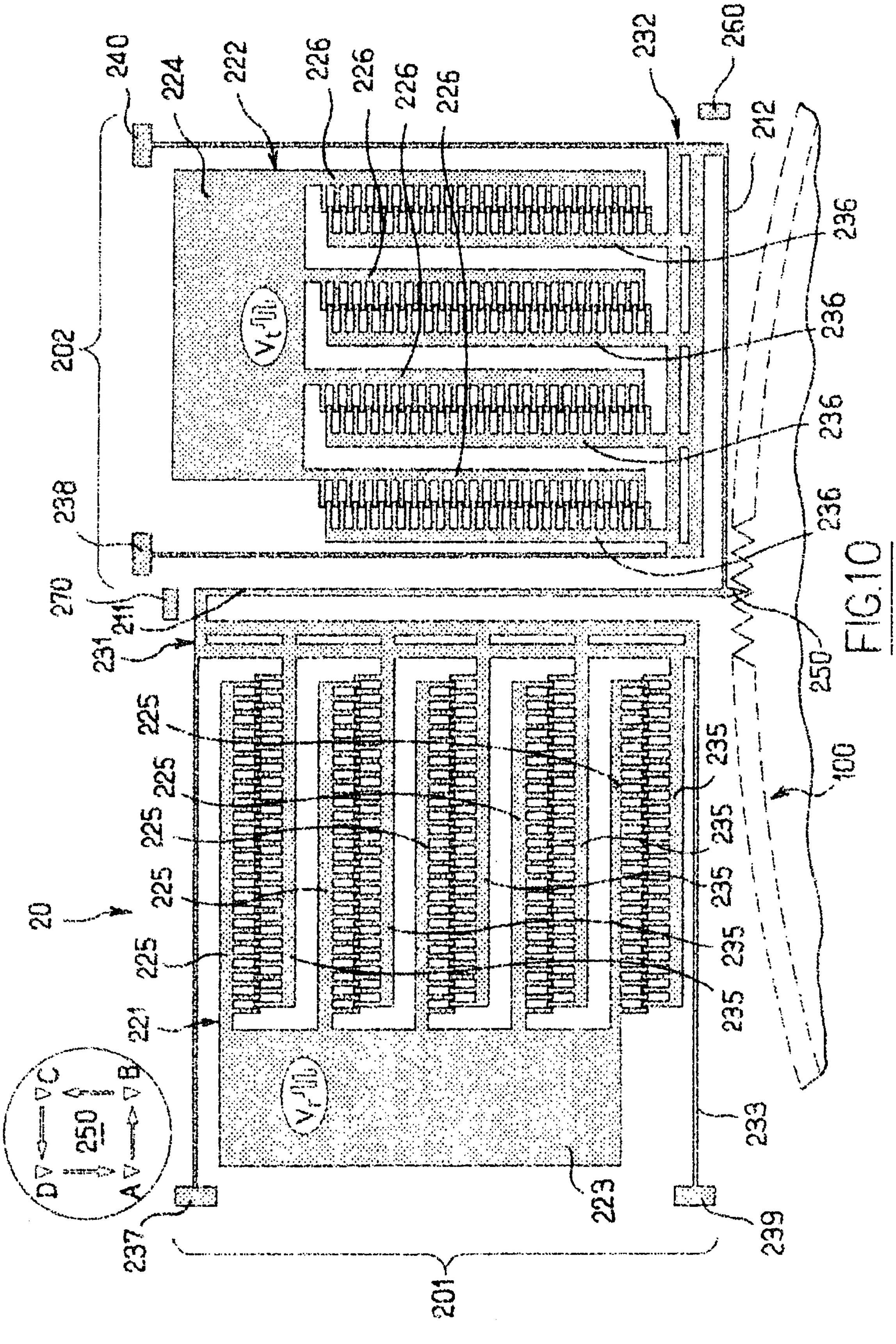
FIG. 10 is a detailed representation of a structure of an actuator element of the drive device, as well as a drive element.

FIG. 10 represents, in greater detail, the drive device 10 with the actuator element 20 and the drive element 250 in the form of a tooth 250. The actuator element 20 is composed mainly of a first elementary actuating module 201 that is capable of moving the drive element 250 in a first direction (the radial direction) in relation to the driven element 100, and of a second elementary actuating module 202 that is capable of moving the drive element 250 in a second direction (the tangential direction) in relation to the driven element 100. The actuating modules 201 and 202 are capable of being controlled simultaneously in order to generate a combined hysteresis movement of the drive element 250.

The drive element 250 is positioned close to the driven element 100 with the point directed toward the wheel, in a radial direction in relation to the latter. The drive element or tooth 250 is thus able to mesh with the teeth of the input sprocket wheel 100.

In the remainder of this document, the term "radial" refers to any element lying or moving in a radial direction in relation to the driven element 100, and the term "tangential" refers to any element lying or moving in a tangential direction in relation to the wheel, with the directions radial and tangential being considered at the point of the wheel at which the drive tooth is located.

The term "fixed" refers to any element that is fixed in relation to the support of the drive device and the term "mobile" refers to any element that is held at a certain altitude in relation to the support or to the elastic suspension means.

The drive tooth 250 is connected by a radial flexible rod 211 to the radial actuating module 201 and by a tangential flexible rod 212 to the tangential actuating module 202. The radial 201 and tangential 202 actuating modules are electrostatic modules with a comb-like structure, generally known as a comb drive. This type of structure includes interdigital comb pairs.

A more precise description will now follow of the radial 201 and tangential 202 actuating modules of the actuator element structure 20.

The radial actuating module 201 is formed from a fixed part 221 and a mobile part 231 to which the radial rod 211 is connected.

The fixed part 221 includes a radial electrode 223 from which a set of fixed parallel combs 225 extends in a radial direction. Each comb 225 is formed from a main rod and a series of parallel fingers or cilia connected to the rod and extending perpendicularly in relation to the latter.

The mobile part 231 includes a mobile frame 233 in the general shape of a U and located around the fixed part 221. The mobile frame 233 is connected at each of its ends to the substrate by means of restraining links 237, 239 constituting elastic suspensions. Combs 235 extend from the mobile frame 233 in a generally radial direction. These combs 235 are formed from a main rod and a series of parallel fingers or cilia connected to the rod and extending perpendicularly to the latter.

The combs 225 of the fixed part 221 and the combs 235 of the mobile part 231 are positioned parallel to each other and interleaved with each other. Moreover, each mobile comb 235 is positioned opposite to a fixed comb 225 so that their fingers interleave with each other, thus forming a pair of so-called "interdigital" combs.

The tangential actuating module 202 has a structure similar to that of the radial actuating module 201, except that it is oriented perpendicularly to the latter. It is formed from a fixed part 222 and a mobile part 232 to which the tangential rod 211 is connected.

The fixed part 222 includes a tangential electrode 224 from which a set of fixed parallel combs 226 extends in a radial direction.

The mobile part 232 includes a mobile frame 232 connected at each of its ends to the substrate by means of restraining links 238, 240 constituting elastic suspensions. Combs 236 extend from the mobile frame 232 in a general tangential direction.

The combs 226 of the fixed part 222 and the combs 236 of the mobile part 232 are positioned parallel to each other and interleaved with each other. In addition, each mobile comb 236 is positioned opposite to a fixed comb 226 so that their fingers interleave with each other, thus forming a pair of interdigital combs.

A description will now follow of the operation of the radial and tangential modules.

The interleaved fingers of the interdigital combs act like flat capacitors in which one of the plates is connected to electrode 223 or 222 and the other plate is grounded or connected to earth via the restraining links 237, 239 or 238, 240.

When a voltage is applied to the radial electrode 223, this voltage creates a potential difference between the fixed part 221 and the mobile part 231 of the actuating module 201. An electric field is established between the plates of the capacitors formed by the fingers of the combs 225 and 235. This electric field generates a tangential electrostatic force which tends to move the mobile combs 235 in relation to the fixed combs 225 in a direction parallel to the fingers of the combs, and to move the drive element 250 in a corresponding direction.

The tangential electrostatic force, acting between the comb fingers, drives the deformation of the frame 233 and, as a result, the movement of the drive tooth 250 by the action of the rod 211 in a radial direction in relation to the driven element 100. Frame 233 then allows movement of the mobile combs 235 only in the direction of the fingers.

Likewise, the same phenomenon occurs when a voltage is applied to electrode 224. The electrostatic force created drives the deformation of the frame 232 and the movement of the drive tooth 250 by the action of the rod 212 in a tangential direction in relation to the driven element 100. Frame 232 allows movement of the mobile combs 236 only in the direction of the fingers.

The tangential actuating module 202 includes a locating post 260 that is used to limit the amplitude of movement of the mobile frame in order to hold the mobile part 232 at a distance from the fixed part 222 and prevent the mobile combs 236 from coming into contact with the fixed combs 226. In fact, the bringing into contact of the fixed and mobile combs 226 and 236, which are at different potentials, would necessarily result in an electrical short-circuit in the device.

For its part, the movement of the frame of the radial actuating module 201 is limited by the presence of a stop 270 which limits the movement of the drive tooth 250 in a radial direction.

It will be observed that the lateral flexibility of each of the rods allows the deformation of the latter under the action of the other rod. The two flexible radial and tangential rods 211 and 212 bring about a mechanical decoupling of the two actuating modules 201 and 202. In fact, the flexibility of the rods allows a movement of the drive tooth 250 independently with two elementary degrees of freedom, namely in the two radial and tangential directions of motion.

The decoupling of the actuating modules 201 and 202 allows them to take up position in a parallel configuration. The parallel configuration of the two actuating modules 201 and 202 (as distinct from a series configuration) improves access to the electrodes 223 and 224 for the placement of power connections.

The electrodes 223 and 224 are controlled by phase-offset alternating voltages $V_r$ and $V_t$ with, for example, a phase offset of a quarter of a period in relation to each other, so that the tooth 250 is moved with a hysteresis-type motion (movement A-B-C-D). The hysteresis movement of the drive tooth 250 alternates between the drive (movement A-B) and disengaged (movement B-C-D-A) phases. This movement allows the drive tooth 250 to mesh with the successive teeth of the driven element 100 and to drive the driven element 100 in a stepped rotation movement in the clockwise direction. The driven element 100 is driven in rotation by low-amplitude excursions of the drive element.

To this end, the clock mechanism can advantageously include control means designed to apply periodic addressing voltages $V_r$ and $V_t$ at a frequency of more than 10 Hz. Such a frequency is used in order to achieve rotation movements of the hands that appear to the eye to be continuous. The drive frequency of the hands gives the optical illusion of a continuous movement of the hands. Such an effect is associated with retinal persistence which prevents the stepping movement of the hands from being followed in real time. The quartz watch or clock mechanism can therefore be viewed as a mechanical device. Moreover, the drive device 10 is used to cause the rotation speed of the hands to vary. To this end, the control means are designed so that they are able to vary the frequency of the addressing signals $V_r$ and $V_t$. This characteristic is particularly advantageous since it allows the position of the hands to be changed rapidly, such as when resetting the time or otherwise adjusting the watch or the clock, for example.

Furthermore, the drive device 10 is reversible, since it allows the driven element 100 to be moved in the clockwise or counterclockwise direction. To this end, the control means are capable of reversing the phase offset between the addressing signals $V_r$ and $V_t$ in order to reverse the hysteresis movement of the drive element 250 and thus reverse the direction of rotation of the driven element 100.

Finally, the drive device 10 is positioned in relation to the driven element 100 so that at rest, when the drive device is not powered, the drive element 250 meshes with the driven element 100. The drive element 250 is in the meshed position (position A) when no signal is applied to the electrodes 224 and 223. This characteristic means that when the device is not supplied with energy, the engaging of the wheel is performed by element 250. As a consequence, the device has a lower energy consumption.

Figure 11:
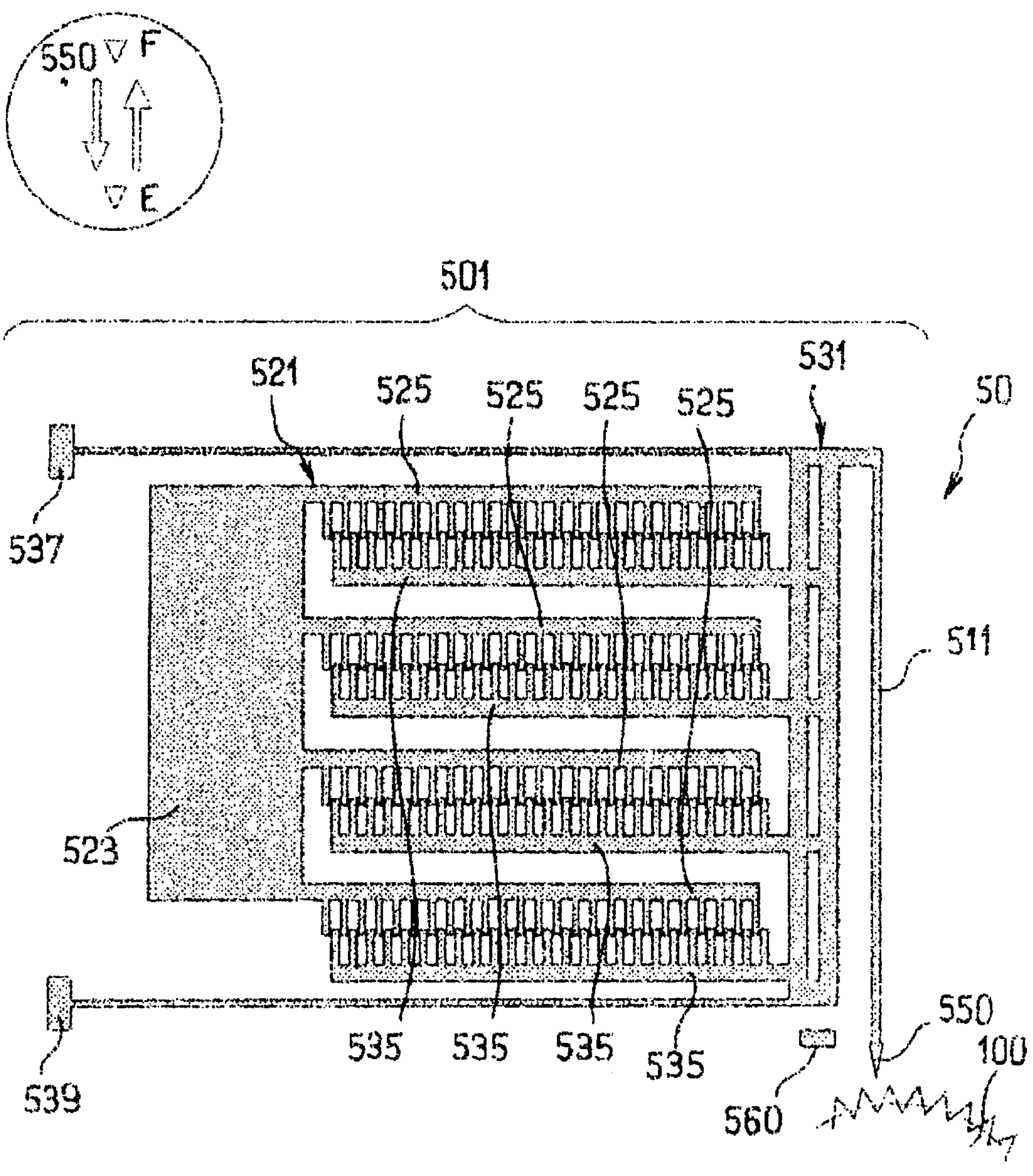
FIG. 11 is a detailed representation of a structure of an engaging actuator, as well as an engaging element.
Figure 14:
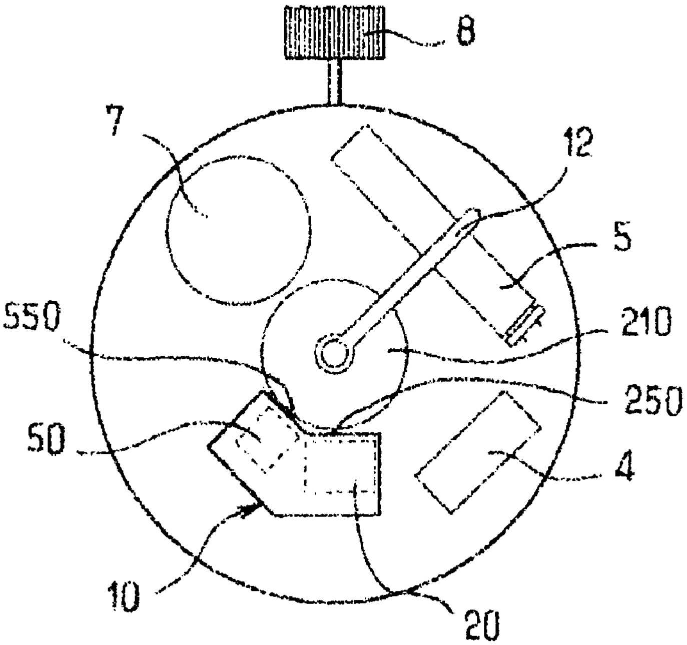
FIG. 14 schematically represents a quartz watch mechanism according to a variant of the second embodiment of the invention.

FIG. 11 represents an engaging actuator element 50 which can be used in the embodiment of the clock mechanisms of FIGS. 6 and 14. The engaging actuator element 50 is composed of a single radial actuating module 501 and a drive element in the form of a tooth 550. The radial actuating module 501 is similar to the radial actuating module 201 of the drive actuator element 20.

The radial actuating module 501 is formed from a fixed part 521 and a mobile part 531 to which a radial rod 511 is connected.

The fixed part 521 includes a radial electrode 523 from which a set of fixed parallel combs 525 extends in a radial direction. Each comb 525 is formed from a main rod and a series of parallel fingers or cilia connected to the rod and extending perpendicularly in relation to the latter.

The mobile part 531 includes a mobile frame 533 in the general shape of a U and located around the fixed part 521. The mobile frame 533 is connected at each of its ends to the substrate by means of restraining links 537, 539 constituting elastic suspensions. Combs 535 extend from the mobile frame 533 in a generally radial direction. These combs 535 are formed from a main rod and a series of parallel fingers or cilia connected to the rod and extending perpendicularly to the latter.

The combs 525 of the fixed part 521 and the combs 535 of the mobile part 531 are positioned parallel to each other and interleaved with each other. Moreover, each mobile comb 535 is positioned opposite to a fixed comb 525 so that their fingers interleave with each other, thus forming a pair of so-called "interdigital" combs.

The drive tooth 550 is of triangular shape. It is positioned close to the driven element 100 with the point directed toward the driven element, in a radial direction in relation to the latter. The drive tooth 550 is thus able to mesh with the teeth of the driven element 100.

The actuator element 50 also includes a stop 560 that is used to hold the mobile part 531 at a distance from the fixed part 521 in order to prevent the mobile combs 535 from coming into contact with the fixed combs 525.

The engaging module 501 of the engaging actuator element 50 is controlled in synchronisation with the elementary radial 201 and tangential 202 actuating modules of the drive actuator element 20. The engaging actuator element 50 has the function of keeping the driven element 100 in position when the tooth 250 of the drive device is disengaged. The conjunction of the drive actuator element and the engaging actuator element provides precise control over the positioning of the driven element 100. The engaging actuator element 50 is controlled so that it moves the tooth 550 in an alternating radial movement in relation to the driven element 100.

The movement of the tooth 550 is synchronized with that of the tooth 250. When the drive tooth 250 meshes with the driven element 100 and drives the latter in rotation (movement A-B), the engaging tooth 550 is disengaged (in position F). When the drive tooth 250 is disengaged (movement B-C-D-A), the engaging tooth 550 is inserted between the teeth of the driven element 100 (in position E) in order to hold the driven element in its position.

Figure 15:
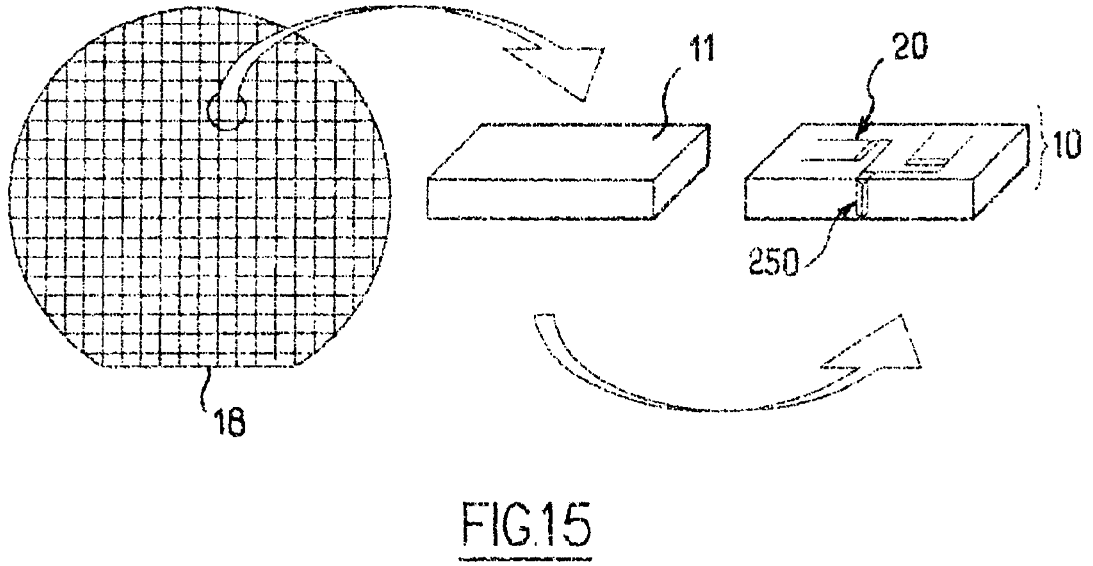
FIG. 15 schematically illustrates the creation of an actuator element from a wafer of silicon.

As illustrated in FIG. 15, the wafer 11 on which the drive device is formed is composed of a portion of a wafer 18. A large number of elementary drive devices can thus be etched simultaneously on a single wafer using a collective production method.

Figure 7:
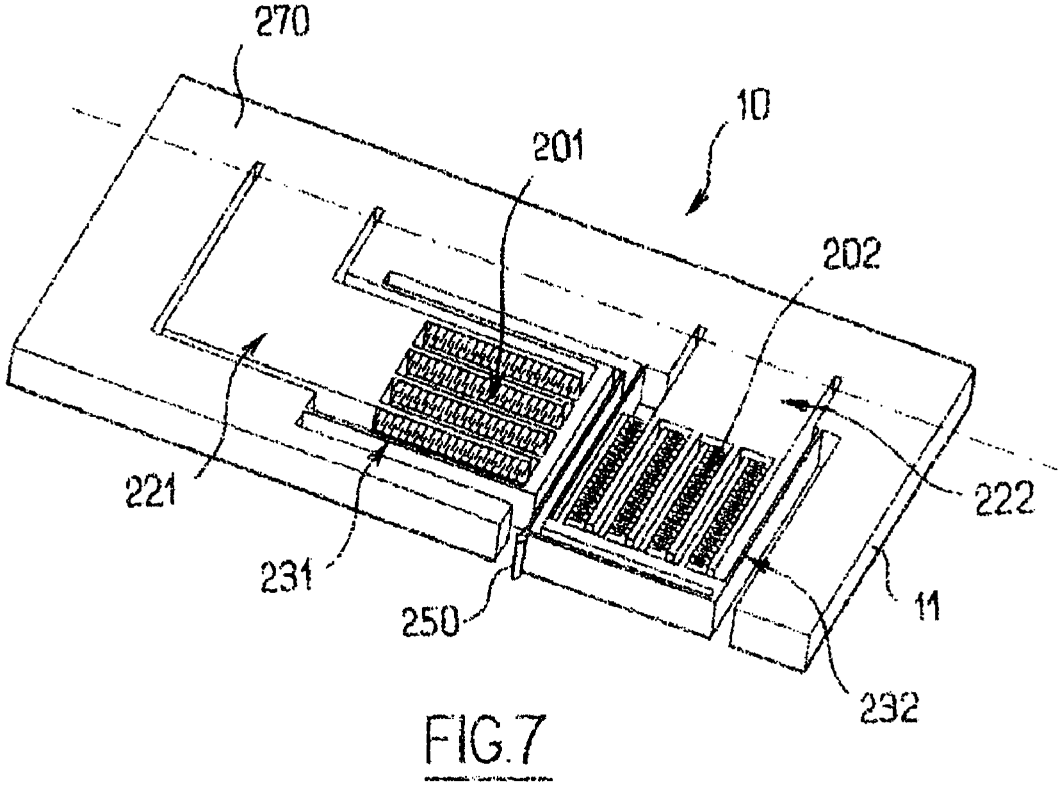
FIG. 7 schematically represents, the actuator element of the drive device, as well as the drive element, as they are created by a monolithic etching technique in a wafer of silicon.
Figure 8:
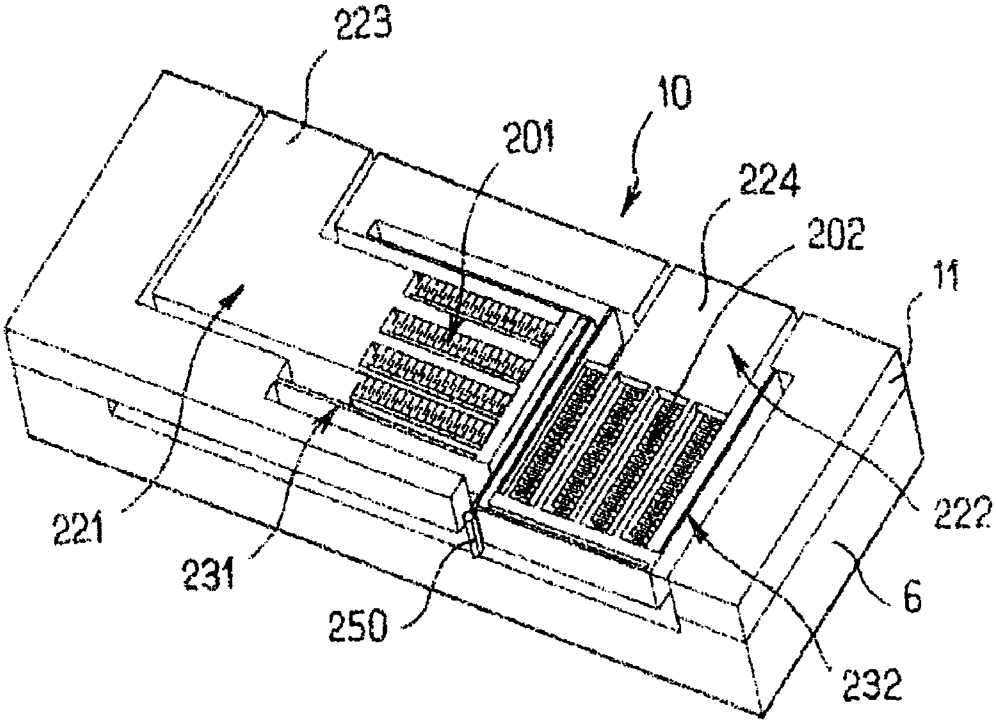
FIG. 8 schematically represents the actuator element of FIG. 7 mounted on a substrate, after executing a cut that separates the addressing electrodes from the elementary actuating modules.

FIGS. 7 and 8 schematically illustrate a first technique for the creation of a drive device.

According to this first technique, the actuating modules 201 and 202, the drive element 250, and where appropriate the engaging module and the engaging element (not shown), are created by deep plasma etching (Deep Reactive Ion Etching or RIE) in a solid wafer 11. The wafer 11 can be a single block of monocrystalline silicon for example, whose thickness is between 200 and 300 μm. The wafer is etched through all of its thickness to form the various elements making up the actuating device. As can be seen in FIG. 7, all of the elements making up the actuating device (fixed parts 221, 222 and mobile parts 231, 232) are connected to a common dorsal link 270 formed in the wafer.

Following the etching operation, the actuating device is of monolithic form. The wafer 11 is hybridized onto a support 6 in FIG. 8 and the link 270 is eliminated. Removal of the link 270 is effected to electrically isolate the fixed parts 221 and 222 and mobile parts 231 and 232 from each other. The support 6 performs a function of electrical insulation and anchoring for the fixed and mobile parts of the elementary actuating modules 201 and 202.

Figure 9:
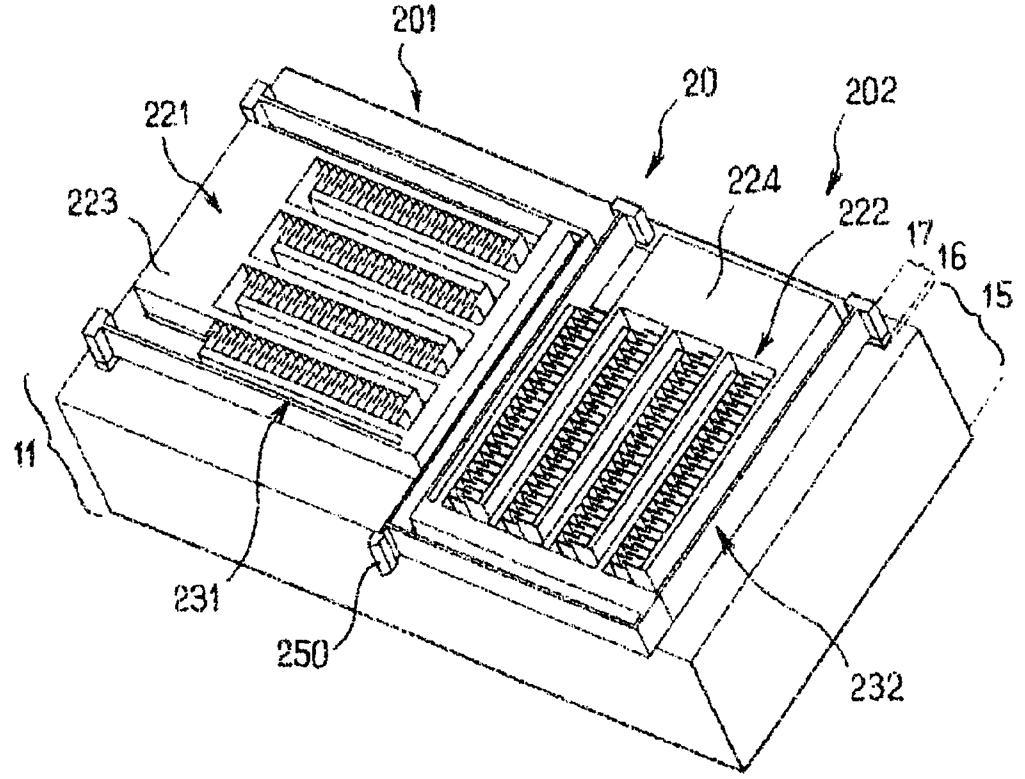
FIG. 9 schematically represents, a drive device and a drive element as they are created directly by etching a silicon-on-insulator (SOI) substrate.

FIG. 9 schematically illustrates a second technique for the creation of an actuating device.

In this second technique, the drive device 10 is created by deep plasma etching (Deep Reactive Ion Etching or RIE) in a wafer 11 of the SOI (Silicon On Insulator) type. Such a wafer 11 includes a silicon substrate layer 15 with a thickness on the order of 380 μm, a sacrificial layer 16 of silicon oxide with a thickness of about 2 μm and a silicon layer 17 with a thickness on the order of 50 to 100 μm.

The actuating modules 201 and 202, the drive element 250, and where appropriate the engaging module and the engaging element (not shown), are created by deep reactive ion etching (RIE) in the thickness of the silicon layer 15, up to the silicon oxide layer 16 which constitutes a stop layer. Then the silicon oxide layer 16 is dissolved in zones by wet chemical etching. The dissolved zones liberate the mobile parts of the drive device (mobile combs, rods, drive element, etc.).

The parts 16 of the silicon oxide layer that remain after the dissolving action create links between the substrate layer 15 and the actuating modules 201 and 202. The mobile parts 231, 232 of the actuating modules are then raised in relation to the substrate layer 15 to an altitude or height equal to the thickness of the sacrificial silicon oxide layer. The silicon oxide layer performs a function of electrical insulation and anchoring support for the fixed and mobile parts of the elementary actuating modules 201 and 202.

The resulting drive device can then be hybridized onto an insulating support 6.

Other techniques for creation of the actuating device can be employed equally well of course. It is possible, for example, to use an HARPSS etching technique (High Aspect Ratio combined Poly and Single-crystal Silicon) on a wafer of silicon.

In comparison with the traditionally motor-driven mechanisms used in the clockmaking field, the drive device that has just been described generally has the following advantages:

it allows partial or total removal of the gearing stages in the quartz watch or clock mechanisms, as a result, it improves the efficiency of the clock gear trains, as a result, it provides greater independence to the quartz watch or clock mechanisms, it allows simplification of the mechanical architecture of the clock movements, and it also allows production costs to be reduced.

Figure 16:
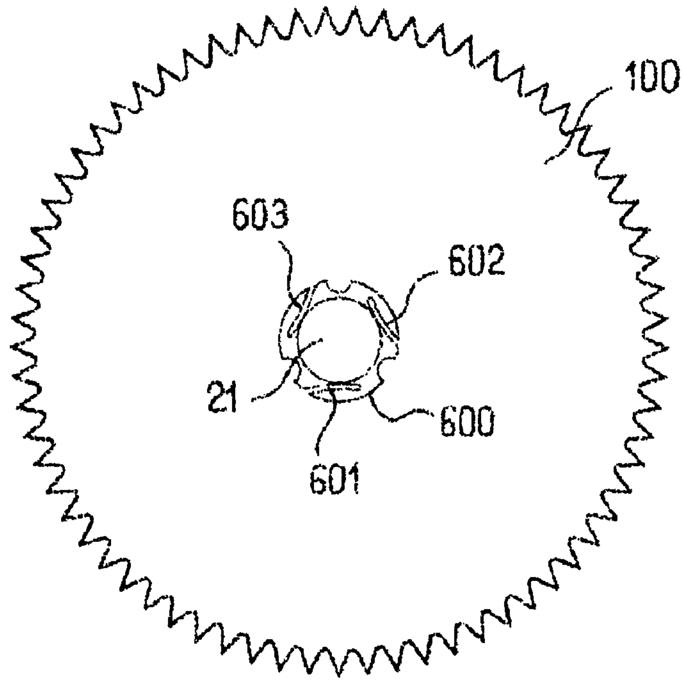
FIG. 16 schematically represents a micro-machined driven element that has means for taking up the clearance between the wheel and the axle.

FIG. 16 schematically represents a toothed wheel 100 formed by etching a substrate. The driven element 100 includes a hole 600 formed at its center, this hole being intended to receive an axle 21, around which the driven element 100 is designed to rotate. The mechanism includes means to take up the play between the driven element 100 and the axle 21. The means for taking up the play include a multiplicity of flexible elastic leaves 601, 602 and 603 positioned between the driven element 100 and the axle 21. More precisely, as illustrated in FIG. 16, the leaves 601, 602 and 603 are formed integrally with the driven element 100 during the etching stage. The leaves 601, 602 and 603 are formed during the etching of the central hole 600. Each elastic leaf 601, 602 and 603 extends from the driven element 100 and makes contact with the axle 21.

Figure 17:
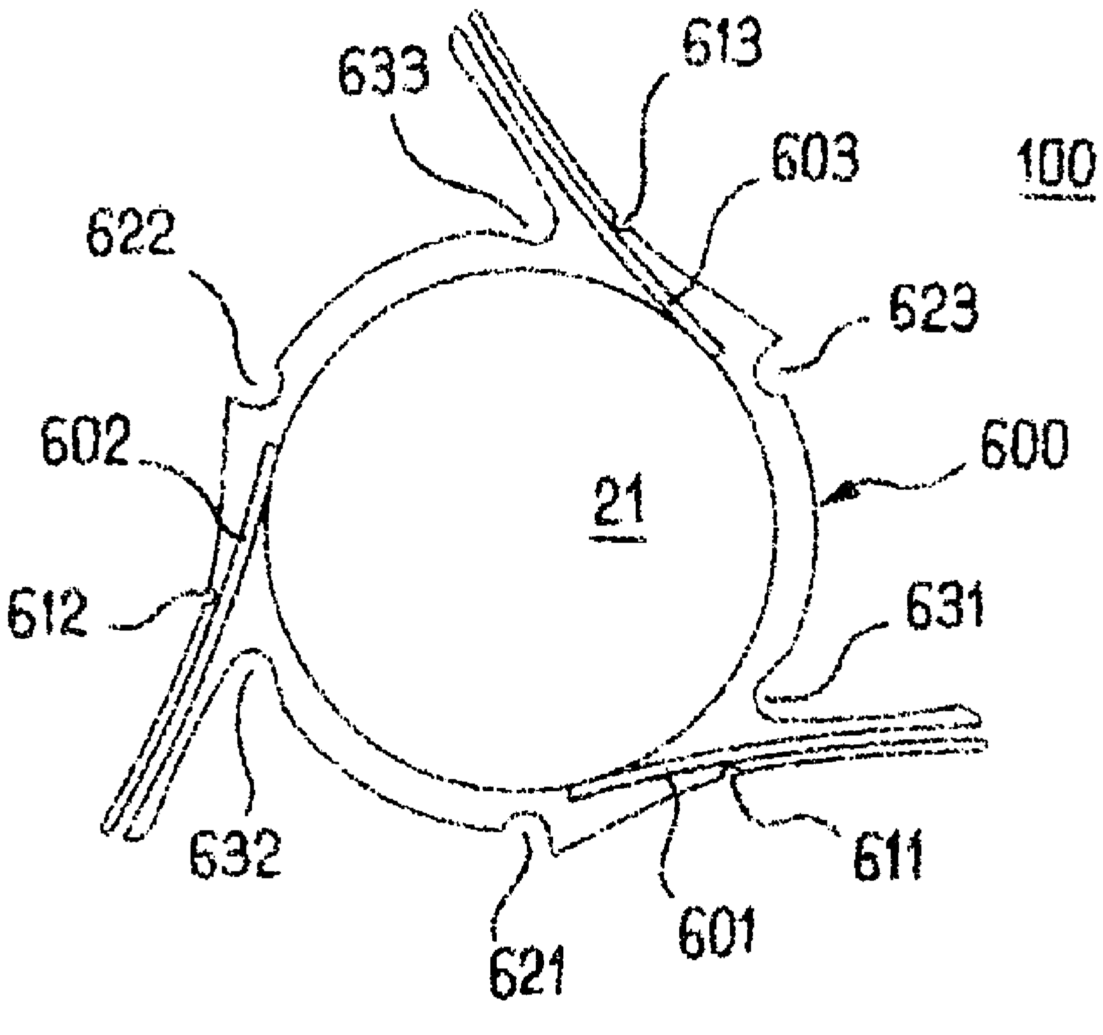
FIG. 17 represents the means for taking up the play, which enable spontaneous centering of the driven element on the axle on which it is mounted.

In a more detailed manner, FIG. 17 represents the position of the hole 600 in the driven element 100 in relation to the axle 21 when the axle 21 is centered in relation to the hole 600. As can be seen in this figure, the leaves 601, 602 and 603 are formed as a single part with the driven element 100 during the etching of the hole 600. To this end, the hole created in the driven element 100 is not circular, but is cut out to form reliefs making up the means that take up the play between the driven element 100 and the axle 21.

The reliefs in particular include the flexible leaves 601, 602 and 603. The flexible leaves are used to hold the driven element 100 on the rotation axle 21 in spite of any play between the hole 600 of the driven element 100 and the rotation axle 21. Moreover, the flexible leaves compensate for any offset from center of the axle and/or of the hole in relation to the driven element.

The reliefs formed by the hole 600 also include locating posts 611, 612 and 613 formed by protuberances, each locating post being positioned between one of the leaves 601, 602 and 603 and the driven element 100. These locating posts 611,

612 and 613 are intended to limit the movement of the leaves 611, 612 and 613 when the latter are flexed.

The reliefs also include locating posts 621, 631, 622, 632, 623 and 633 formed by larger protuberances located on either side of the leaves 601, 602 and 603. The locating posts 621, 631, 622, 632, 623 and 633 are positioned between the axle 21 and the driven element 100. The locating posts 621, 631, 622, 632, 623 and 633 are intended to limit any offset from center of the axle 21 in relation to the hole 600. The locating posts 621, 631, 622, 632, 623 and 633 thus limit the deformation of the leaves 601, 602 and 603 and guarantee continuous contact of the axle 21 with all of the leaves.

The invention claimed is:

1. A drive device comprising a drive element that is capable of meshing sequentially with a driven element and an actuator element that is capable of moving the drive element with a hysteresis-type motion so that it drives the driven element, the drive device formed by etching a wafer and wherein the drive element is positioned on an external edge of the wafer to allow interfacing of the drive element with the driven element facing it.

2. A device according to claim 1, wherein the wafer is formed from a semiconductor material.

3. A device according to claim 2, wherein the semiconductor material is silicon.

4. A device according to claim 3, created by a deep reactive ion etching (RIE) technique on a single wafer of monocrystalline silicon.

5. A device according to claim 3, created by a deep reactive ion etching (RIE) technique on a wafer.

6. A device according to claim 3, created by an HARPSS etching technique.

7. A device according to claim 1, wherein a plurality of drive devices are simultaneously etched onto a wafer of semiconductor material.

8. A device according to claim 1, wherein the actuator element comprises a first actuating module that is capable of moving the drive element in a first direction in relation to the driven element, and a second actuating module that is capable of moving the drive element in a second direction in relation to the driven element, with the first and second actuating modules being capable of being controlled simultaneously to generate a combined hysteresis movement of the drive element.

9. A device according to claim 8, wherein the first actuating module is capable of moving the drive element in a radial direction in relation to the driven element, and the second actuating module is capable of moving the drive element in an axial direction in relation to the driven element.

10. A device according to claim 9, wherein the drive element is connected by a radial flexible rod to the first actuating module and by a tangential flexible rod to the second actuating module, with the radial and tangential flexible rods enabling movement of the drive element independently under the action of either of the first and second actuating modules.

11. A device according to claim 8, wherein the first and second actuating modules comprise interdigital combs.

12. A device according to claim 11, wherein the first and second actuating modules each includes at least one fixed comb and one mobile comb, each comb having a series of fingers, the mobile comb positioned opposite to the fixed comb with fingers of the fixed comb and fingers of the mobile comb interleave with each other, and in which the mobile comb is capable of being moved in relation to the fixed comb in a direction parallel to the fingers of the combs on the application of a potential difference between the fixed comb and the mobile comb to move the drive element in a corresponding direction.

13. A device according to claim 8, wherein the first and second actuating modules are controlled by periodic signals ($V_r$,$V_t$) presenting a phase offset of a quarter of a period in relation to each other.

14. A clock mechanism comprising a drive device according to claim 1 and a driven element capable of being driven in rotation by the drive device.

15. A mechanism according to claim 14, comprising a single driven element and several output wheels, wherein the drive device meshes with the driven element, and the driven element is able to drive in rotation one or more output wheels.

16. A mechanism according to claim 15, wherein the driven element is associated with an input sprocket wheel which meshes with the output wheel or wheels, the driven element being associated with the input sprocket wheel by a complete and coaxial link.

17. A mechanism according to claim 14, wherein the driven element is directly attached to a hand to be driven, and the drive device meshes with the driven element.

18. A mechanism according to claim 17, including a plurality of drive devices and a plurality of driven elements, wherein each drive device meshes with an associated driven element, with each driven element being attached to a hand.

19. A mechanism according to claim 18, wherein the drive devices are identical to each other.

20. A mechanism according to claim 14, wherein the driven element is created by a micromanufacturing technique comprising deep reactive ion etching (RIE) on a monolithic wafer of monocrystalline silicon or on a wafer of the SOI type.

21. A mechanism according to claim 14, additionally comprising control means for moving the drive element with an alternating movement at a frequency of more than 10 Hz.

22. A mechanism according to claim 14, additionally comprising an axle on which the driven element is mounted to rotate, and means for taking up the clearance between the driven element and the axle.

23. A mechanism according to claim 22, wherein the means to take up the clearance are formed as a single part with the driven element during the etching of a hole in the driven element, the hole being for receiving the axle.

24. A mechanism according to claim 22, wherein the means for taking up the clearance comprises at least one elastic leaf positioned between the driven element and the axle.

25. A mechanism according to claim 24, wherein the means for taking up the clearance additionally comprises at least one locating post formed by a protuberance positioned between the leaf and the driven element.

26. A mechanism according to claim 22, in which the means for taking up the clearance comprises at least one stop positioned between the axle and the driven element.

27. A mechanism comprising:

a first subassembly that includes a drive device according to claim 8, a second subassembly that includes a driven element, and a base onto which the first and second subassemblies are fixed to allow interfacing of the drive element with the driven element facing it, wherein the subassemblies are modular and interchangeable.

28. A mechanism comprising:

a first subassembly that includes a drive device according to claim 9, a second subassembly that includes a driven element, and a base onto which the first and second subassemblies are fixed to allow interfacing of the drive element with the driven element facing it, wherein the subassemblies are modular and interchangeable.

29. A mechanism comprising:

a first subassembly that includes a drive device according to claim 10, a second subassembly that includes a driven element, and a base onto which the first and second subassemblies are fixed to allow interfacing of the drive element with the driven element facing it, wherein the subassemblies are modular and interchangeable.

30. A mechanism comprising:

a first subassembly that includes a drive device according to claim 11, a second subassembly that includes a driven element, and a base onto which the first and second subassemblies are fixed to allow interfacing of the drive element with the driven element facing it, wherein the subassemblies are modular and interchangeable.

31. A mechanism comprising:

a first subassembly that includes a drive device according to claim 12, a second subassembly that includes a driven element, and a base onto which the first and second subassemblies are fixed to allow interfacing of the drive element with the driven element facing it, wherein the subassemblies are modular and interchangeable.

* * * * *